US012643986B2

(12) United States Patent
Lu

(10) Patent No.: US 12,643,986 B2
(45) Date of Patent: Jun. 2, 2026

(54) METHOD FOR MANUFACTURING A NEW SOUND-ABSORBING AND NOISE-REDUCING MATERIAL BY USING POLYIMIDE FOAM SCRAPS

(71) Applicant: Zhiyi Lu, Shanghai (CN)

(72) Inventor: Zhiyi Lu, Shanghai (CN)

( * ) Notice: Subject to any disclaimer, the term of this patent is extended or adjusted under 35 U.S.C. 154(b) by 1110 days.

(21) Appl. No.: 17/673,818

(22) Filed: Feb. 17, 2022

(65) Prior Publication Data

US 2023/0257545 A1     Aug. 17, 2023

(51) Int. Cl.
| | |
|---|---|
| *C08J 9/33* | (2006.01) |
| *C08J 5/18* | (2006.01) |
| *C08J 9/00* | (2006.01) |
| *C08L 75/08* | (2006.01) |

(52) U.S. Cl.
CPC . *C08J 9/33* (2013.01); *C08J 5/18* (2013.01); *C08J 9/0061* (2013.01); *C08J 9/0066* (2013.01); *C08L 75/08* (2013.01); *C08J 2375/08* (2013.01); *C08J 2479/08* (2013.01); *C08L 2203/14* (2013.01); *C08L 2207/20* (2013.01)

(58) Field of Classification Search
CPC . C08J 9/33; C08J 9/0061; C08J 9/0066; C08J 5/18; C08J 2375/08; C08J 2479/08; C08L 75/08; C08L 2207/20; C08L 2203/14

USPC .......................................................... 521/40
See application file for complete search history.

(56) References Cited

U.S. PATENT DOCUMENTS

| | | | |
|---|---|---|---|
| 11,124,619 B2 * | 9/2021 | Gu ............................ | C08K 9/04 |
| 2019/0139527 A1 * | 5/2019 | Cao ....................... | G10K 11/165 |
| 2020/0070456 A1 * | 3/2020 | Hsiao .................... | B29C 44/445 |

FOREIGN PATENT DOCUMENTS

| | | | |
|---|---|---|---|
| CN | 110256673 A | * | 9/2019 |
| JP | 2007063380 A | * | 3/2007 |

* cited by examiner

*Primary Examiner* — Callie E Shosho

(57) ABSTRACT

The invention discloses a method for manufacturing a new sound-absorbing and noise-reducing material by using polyimide foam scraps, cutting and processing the scraps generated in the process of polyimide foam production into particles of different sizes, drying red iron oxide or black iron oxide or titanium dioxide as inorganic additive, and then using each component in parts by weight, putting the inorganic additive into the mixer, and then putting the polyimide foam particles of different sizes into the mixer to mix, injecting the curing agent into the mixer to continue mixing, and finally adding the catalyst into the mixer to continue mixing, putting the mixed material into the mold evenly to form the film, leaving it for 10 hours, opening the mold, taking out the product, removing the burrs, and cutting the product according to customer needs, and packing it in a carton for storage.

5 Claims, No Drawings

METHOD FOR MANUFACTURING A NEW SOUND-ABSORBING AND NOISE-REDUCING MATERIAL BY USING POLYIMIDE FOAM SCRAPS

TECHNICAL FIELD

The invention relates to the technical field of material processing, in particular to a method for manufacturing a new sound-absorbing and noise-reducing material by using polyimide foam scraps.

BACKGROUND

Polyimide foam is an excellent thermal insulation and sound absorbing material, it has excellent fire resistance and thermal insulation performance and certain sound absorption and noise reduction performance, the NRC value reaches about 0.68 when the thickness is 40 mm, since polyimide foam will produce more than 60% of the scraps in the process of the production, cannot be reused, resulting in high production costs, because polyimide foam has excellent fire resistance, the treatment of the scraps with environmental incineration will consume a lot of energy and cause extra carbon emissions;

at present, the commonly used sound absorption and noise reduction materials on the market include organic fiber materials, hemp cotton felt, inorganic fiber materials, glass wool, rock wool, mineral wool, urea-formaldehyde foam, urethane foam, melamine foam, polyimide foam, rubber and plastic foamed sound-absorbing materials, etc, these materials generally have the following problems:

1) the sound absorption performance is limited, and a large thickness is often required to achieve broadband effective sound absorption;
2) the fire resistance is limited, many organic materials have a low oxygen index and are easily ignited, or release a large amount of toxic gas when burning, and produce high-temperature droplets, resulting in rapid fire spread;
3) environmental protection performance is limited, materials such as glass wool and rock wool have fiber pollution problems, which affect the health of the user's respiratory system, some organic materials such as rubber and plastic foam have strong odor and high content of harmful chemicals, which are not suitable for indoor environment, melamine foam materials and so on will also release harmful gases such as formaldehyde;
4) weight, materials such as rubber and plastic foam sound-absorbing with high density (280±20 kg/m³), have requirements on the structural strength of the installation site;
5) water absorption and damp, fiber material is easy to absorb water and damp, and the acoustic performance will be affected after damp, and the material itself is easy to mildew;
6) the process of the production, the production process of materials such as glass wool and rock wool is a process with high energy consumption and high emission, which is not conducive to achieving carbon neutrality and carbon emission standards, and belongs to the industry of environmental protection production limit, polyurethane production also has strict environmental protection requirements, and requires higher investment and safety supervision of enterprises;

7) the process of the installation, fibrous materials are not friendly to the installers, which will cause itching, pneumoconiosis and other problems;
8) reuse, many sound-absorbing materials cannot be reused;
9) service life, once materials such as glass wool, rock wool, melamine foam encounter water or receive external impact, they will be deformed, damaged, or even lose their functions.

SUMMARY OF THE INVENTION

The technical problem to be solved is to overcome the defects of the above technologies and provide a new sound-absorbing and noise-reducing material by using polyimide foam scraps.

In order to solve the above technical problems, the technical scheme provided by the invention is a new sound-absorbing and noise-reducing material by using polyimide foam scraps, comprising the following steps:

step 1) selecting the scraps produced in the process of polyimide foam production, cutting them into particles of different sizes, and screening them for standby;

step 2) selecting inorganic additive, and carrying out drying treatment, controlling temperature to 60-100° C., drying time is 4-8 h for standby;

step 3) selecting curing agent for standby; according to changes in weather and temperature, selecting an appropriate amount of water as catalyst of curing agent for standby;

step 4) selecting the particles of different sizes obtained in step 1, the inorganic additive obtained in step 2, the curing agent and catalyst described in step 3 according to the parts by weight, first, putting the inorganic additive into the mixer, then according to the sizes of particles, putting the polyimide foam particles of different sizes into the mixer, mixing for 1-12 min, injecting the curing agent into the mixer and continue mixing for 20-55 minutes, finally adding the catalyst into the mixer and continue mixing for 10-18 minutes to obtain the mixed material;

step 5) putting the mixed material into the mold evenly to form the film, and leaving it for 8-48 h;

step 6) opening the mold, taking out the product, removing the burrs, and cutting the product according to customer needs, and packing it in a carton for storage.

Further, the size of the particle in the step 1 is preferably ≤10 mm.

Further, the inorganic additive in step 2 is preferably selected from red iron oxide or black iron oxide or titanium dioxide.

Further, the curing agent in step 3 is 4,4'-diphenylmethane diisocyanate, polypropylene glycol copolymer.

Further, the components in step 4 are as follows in parts by weight: inorganic additive 1-10 parts, curing agent 10-40 parts, catalyst 1-10 parts, particle≤1 mm, 1-5 parts, 1 mm<particle≤4 mm, 30-60 parts, 4 mm<particle≤6 mm, 5-10 parts, 6 mm<particle≤10 mm, 1-5 parts.

Compared with the existing sound absorption and noise reduction materials, the invention has the following advantages: the manufacturing method and the produced product provided by the invention have the following advantages, 1) compared with polyimide foam, it has better sound absorption performance at the same thickness, and can reach NRC=0.8 when the thickness is 25 mm;
2) good fire resistance, can meet the following standards:
   ① EN 13501-1 Class C-s2, d0

②ASTM E84 Class A, FSI<25, SDI<50

③UL94 Class V-0

④Part R1 of EN45545-2, meeting HL1, HL2 and HL3 requirements 3) good aging resistance, UV resistance, ozone resistance;

4) good environmental protection performance, no odor, no formaldehyde, no release of harmful substances such as organic volatiles;

5) the density is lower, the bulk density is $50\pm10$ kg/m$^3$;

6) Hydrophobicity and pressure resistance, long-term use will not mildew, and will not weaken the effect of sound absorption and noise reduction;

7) easy installation, no harm to human body, no fiber and dust pollution, long service life;

8) the production process is environmentally friendly, low energy consumption, and the waste can be recycled.

9) it can be produced by using the scraps generated in the production of polyimide foam on a large scale to reduce the production cost of polyimide foam, and it can reduce the discharge of solid waste and effectively improve the comprehensive benefits of polyimide foam manufacturers.

DESCRIPTION OF EMBODIMENTS

A new sound-absorbing and noise-reducing material by using polyimide foam scraps is further described combined with the following embodiments.

Embodiment 1

Each component in parts by weight, wherein inorganic additive 1 part, curing agent 10 parts, catalyst 1 part, particle≤1 mm, 1 part, 1 mm<particle≤4 mm, 30 parts, 4 mm<particle≤6 mm, 5 parts, 6 mm<particle≤10 mm, 1 part, first, putting the inorganic additive into the mixer, then according to the sizes of particles, putting the polyimide foam particles of different sizes into the mixer, mixing for 3 min, injecting the curing agent into the mixer and continue mixing for 20 min, finally adding the catalyst into the mixer and continue mixing for 10 min to obtain the mixed material, putting the mixed material into the mold evenly to form the film, and leaving it for 10 h, opening the mold, taking out the product, removing the burrs, and cutting the product according to customer needs, and packing it in a carton for storage; wherein, the particles are particles of different sizes formed by cutting and processing polyimide foam scraps, the quality requirements of polyimide foam scraps are flexible blocks, oxygen index ≥40%, density ≤50 kg/m$^3$, and no pollution from impurities such as oil, water, fabric, paper, glue, and other dust, and no odor, the inorganic additive is red iron oxide or black iron oxide or titanium dioxide for drying treatment, controlling temperature to 60-100° C., drying time is 4-8 h, and getting the product; the curing agent is 4,4'-diphenylmethane diisocyanate, polypropylene glycol copolymer; the catalyst is water.

Embodiment 2

Each component in parts by weight, wherein inorganic additive 5 parts, curing agent 25 parts, catalyst 5 parts, particle≤1 mm, 3 parts, 1 mm<particle≤4 mm, 45 parts, 4 mm<particle≤6 mm, 7 parts, 6 mm<particle≤10 mm, 3 parts, first, putting the inorganic additive into the mixer, then according to the sizes of particles, putting the polyimide foam particles of different sizes into the mixer, mixing for 7 min, injecting the curing agent into the mixer and continue mixing for 38 min, finally adding the catalyst into the mixer and continue mixing for 14 min to obtain the mixed material, putting the mixed material into the mold evenly to form the film, and leaving it for 22 h, opening the mold, taking out the product, removing the burrs, and cutting the product according to customer needs, and packing it in a carton for storage; wherein, the particles are particles of different sizes formed by cutting and processing polyimide foam scraps, the quality requirements of polyimide foam scraps are flexible blocks, oxygen index≥40%, density≤50 kg/m$^3$, and no pollution from impurities such as oil, water, fabric, paper, glue, and other dust, and no odor, the inorganic additive is red iron oxide or black iron oxide or titanium dioxide for drying treatment, controlling temperature to 60-100° C., drying time is 4-8 h, and getting the product; the curing agent is 4,4'-diphenylmethane diisocyanate, polypropylene glycol copolymer; the catalyst is water.

Embodiment 3

Each component in parts by weight, wherein inorganic additive 10 parts, curing agent 40 parts, catalyst 10 parts, particle≤1 mm, 5 parts, 1 mm<particle≤4 mm, 60 parts, 4 mm<particle≤6mm, 10 parts, 6 mm<particle≤10 mm, 5 parts, first, putting the inorganic additive into the mixer, then according to the sizes of particles, putting the polyimide foam particles of different sizes into the mixer, mixing for 12 min, injecting the curing agent into the mixer and continue mixing for 55 min, finally adding the catalyst into the mixer and continue mixing for 18 min to obtain the mixed material, putting the mixed material into the mold evenly to form the film, and leaving it for 48 h, opening the mold, taking out the product, removing the burrs, and cutting the product according to customer needs, and packing it in a carton for storage; wherein, the particles are particles of different sizes formed by cutting and processing polyimide foam scraps, the quality requirements of polyimide foam scraps are flexible blocks, oxygen index≥40%, density≤50 kg/m$^3$, and no pollution from impurities such as oil, water, fabric, paper, glue, and other dust, and no odor, the inorganic additive is red iron oxide or black iron oxide or titanium dioxide for drying treatment, controlling temperature to 60-100° C., drying time is 4-8 h, and getting the product; the curing agent is 4,4'-diphenylmethane diisocyanate, polypropylene glycol copolymer; the catalyst is water.

The invention and its embodiments have been described above, and this description is not limiting. All in all, if those skilled in the art are inspired by it, and without departing from the purpose of the invention, any structural modes and embodiments similar to this technical scheme are designed without creativity, and all should belong to the protection scope of the invention.

What is claimed is:

1. A method for manufacturing a new sound-absorbing and noise-reducing material by using polyimide foam scraps, wherein the method comprises the following steps:

step 1) selecting the polyimide foam scraps produced in a process of polyimide foam production, cutting the polyimide foam scraps into particles of different sizes, and screening the particles of different sizes for standby;

step 2) selecting inorganic additive, and carrying out drying treatment by controlling temperature to 60-100° C. where drying time is 4-8 h for standby;

step 3) selecting curing agent and catalyst for standby wherein the catalyst is water;

step 4) selecting the particles of different sizes obtained in step 1), the inorganic additive obtained in step 2), the curing agent and the catalyst described in step 3) according to parts by weight, first, putting the inorganic additive into a mixer, then according to the sizes of particles, putting the polyimide foam particles of different sizes into the mixer, mixing for 1-12 min, injecting the curing agent into the mixer and continue mixing for 20-55 minutes, finally adding the catalyst into the mixer and continue mixing for 10-18 minutes to obtain a mixed material;

step 5) putting the mixed material into a mold evenly to form a film, and leaving the mold for 8-48 h to form a product;

step 6) opening the mold, taking out the product, removing burrs, cutting the product according to customer needs, and packing the product in a carton for storage.

2. The method for manufacturing a new sound-absorbing and noise-reducing material by using polyimide foam scraps according to claim 1, wherein the size of the particles of different sizes in step 1) are ≤10 mm.

3. The method for manufacturing a new sound-absorbing and noise-reducing material by using polyimide foam scraps according to claim 1, wherein the inorganic additive in step 2) is one member selected from the group consisting of red iron oxide, black iron oxide and titanium dioxide.

4. The method for manufacturing a new sound-absorbing and noise-reducing material by using polyimide foam scraps according to claim 1, wherein the curing agent in step 3) is one member selected from the group consisting of 4,4'-diphenylmethane diisocyanate and polypropylene glycol copolymer.

5. The method for manufacturing a new sound-absorbing and noise-reducing material by using polyimide foam scraps according to claim 1, wherein the components in step 4) are as follows in parts by weight: the inorganic additive 1-10 parts, the curing agent 10-40 parts, the catalyst 1-10 parts, particle≤1 mm, 1-5 parts, 1 mm<particle≤4 mm, 30-60 parts, 4 mm<particle≤6 mm, 5-10 parts, 6 mm<particle≤10 mm, 1-5 parts.

* * * * *